(12) United States Patent
Saksa

(10) Patent No.: US 6,952,880 B2
(45) Date of Patent: Oct. 11, 2005

(54) MEASUREMENT AND MARKING DEVICE

(75) Inventor: Thomas A. Saksa, Albany, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/940,363

(22) Filed: Aug. 27, 2001

(65) Prior Publication Data

US 2003/0037448 A1 Feb. 27, 2003

(51) Int. Cl.[7] .............................................. B41G 3/00
(52) U.S. Cl. ........................... 33/35; 33/773; 347/109; 400/88
(58) Field of Search .............................. 33/35, 34, 706, 33/707, 737, 751, 759, 760, 773, 775, 772; 347/109; 400/88

(56) References Cited

U.S. PATENT DOCUMENTS

| | | | | |
|---|---|---|---|---|
| 4,233,749 A | * | 11/1980 | Coulter et al. | 33/520 |
| 4,275,264 A | * | 6/1981 | Houck | 178/19.06 |
| 4,383,301 A | * | 5/1983 | Morita et al. | 33/124 |
| 4,412,232 A | * | 10/1983 | Weber et al. | 346/143 |
| 4,899,228 A | * | 2/1990 | Sano et al. | 358/473 |
| 5,577,330 A | * | 11/1996 | Cheng | 33/772 |
| 5,755,918 A | | 5/1998 | Cetnar et al. | 156/360 |
| 5,825,995 A | * | 10/1998 | Wiklof et al. | 358/1.18 |
| 5,842,793 A | * | 12/1998 | Katayama et al. | 346/143 |
| 5,988,900 A | * | 11/1999 | Bobry | 400/88 |
| 6,312,124 B1 | * | 11/2001 | Desormeaux | 347/109 |
| 6,338,555 B1 | * | 1/2002 | Hirose | 347/109 |
| 6,347,868 B1 | * | 2/2002 | Headrick et al. | 347/109 |
| 6,517,266 B2 | * | 2/2003 | Saund | 400/88 |
| 6,543,893 B2 | * | 4/2003 | Desormeaux | 347/109 |

OTHER PUBLICATIONS

Hewlett–Packard Company, U.S. Appl. No. 09/428,681, filed Oct. 27, 1999, entitled "Solid and Semi–Flexible Body Inkjet Printing System".

* cited by examiner

Primary Examiner—Christopher W. Fulton
Assistant Examiner—Amy R. Cohen

(57) ABSTRACT

A measurement and marking device includes a housing, a positional sensing assembly mounted in the housing, a printhead assembly mounted in the housing, and a controller mounted in the housing and communicating with the positional sensing assembly and the printhead assembly. The positional sensing assembly is adapted to sense a position of the housing relative to an object as the housing is moved along a surface of the object and the printhead assembly is adapted to print on the surface of the object as the housing is moved along the surface of the object. As such, the controller is adapted to operate the printhead assembly to print a mark on the surface of the object based on the position of the housing relative to the object as the housing is moved along the surface of the object.

21 Claims, 9 Drawing Sheets

MEASUREMENT AND MARKING DEVICE

THE FIELD OF THE INVENTION

The present invention relates generally to measurement systems and, more particularly to a hand-held device for measuring an object, marking the object with a measurement, and/or transferring a measurement of the object to another object.

BACKGROUND OF THE INVENTION

To transfer a measurement from a first object to a second object, a user typically follows a process of making and reading the measurement at the first object, recording the measurement by mentally remembering and/or physically writing down the measurement, and reproducing the measurement at the second object by marking the measurement on the second object. Conventional measurement devices for making the measurement include tape measures, scales or rulers, micrometers, etc. Conventional marking devices for recording and/or transferring the measurement include pencils, chalk lines, scribes, etc. Thus, the user must handle or operate a separate measurement device and a separate marking device for transfer of the measurement from the first object to the second object. In addition, the user may also require the use of a recording medium, such as paper, for recording of the measurement during the transfer process.

Unfortunately, any number of errors my occur in the typical measurement transfer process. For example, inaccurate making or reading of the measurement at the first object may occur, inaccurate recording of the measurement by the user may occur, and/or inaccurate reproduction of the measurement at the second object may occur. Transferring multiple measurements, therefore, increases the possibility of such errors. In addition, transferring multiple measurements requires that the process be repeated several times. Understandably, repeating the process several times is tedious. As such, the typical method of transferring a measurement from a first object to a second object is often inefficient and time consuming. In addition, accurately forming a plurality of measurement markings at predetermined intervals on an object with conventional measurement devices and conventional marking devices is difficult.

Accordingly, a need exists for a device which facilitates measurement of an object and marking of the object with a measurement, as well as transfer of a measurement of the object to another object.

SUMMARY OF THE INVENTION

One aspect of the present invention provides a measurement and marking device. The measurement and marking device includes a housing, a positional sensing assembly mounted in the housing, a printhead assembly mounted in the housing, and a controller mounted in the housing and communicating with the positional sensing assembly and the printhead assembly. The positional sensing assembly is adapted to sense a position of the housing relative to an object as the housing is moved along a surface of the object and the printhead assembly is adapted to print on the surface of the object as the housing is moved along the surface of the object. As such, the controller is adapted to operate the printhead assembly to print a mark on the surface of the object based on the position of the housing relative to the object as the housing is moved along the surface of the object.

Another aspect of the present invention provides a method of printing a measurement marking on an object. The method includes moving a housing along a surface of the object, sensing a position of the housing relative to the object, and printing the measurement marking on the surface of the object when the position of the housing relative to the object corresponds to a predetermined position.

Another aspect of the present invention provides a method of transferring a measurement of a first object to a second object. The method first includes moving a housing along a surface of the first object, sensing a position of the housing relative to the first object as the housing is moved along the surface of the first object, and locating a feature of the first object by recording the position of the housing at the feature of the first object. The method then includes moving the housing along a surface of the second object, sensing a position of the housing relative to the second object as the housing is moved along the surface of the second object, and printing a mark representing the feature of the first object on the surface of the second object when the position of the housing relative to the second object coincides with the position of the housing at the feature of the first object.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Since components of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
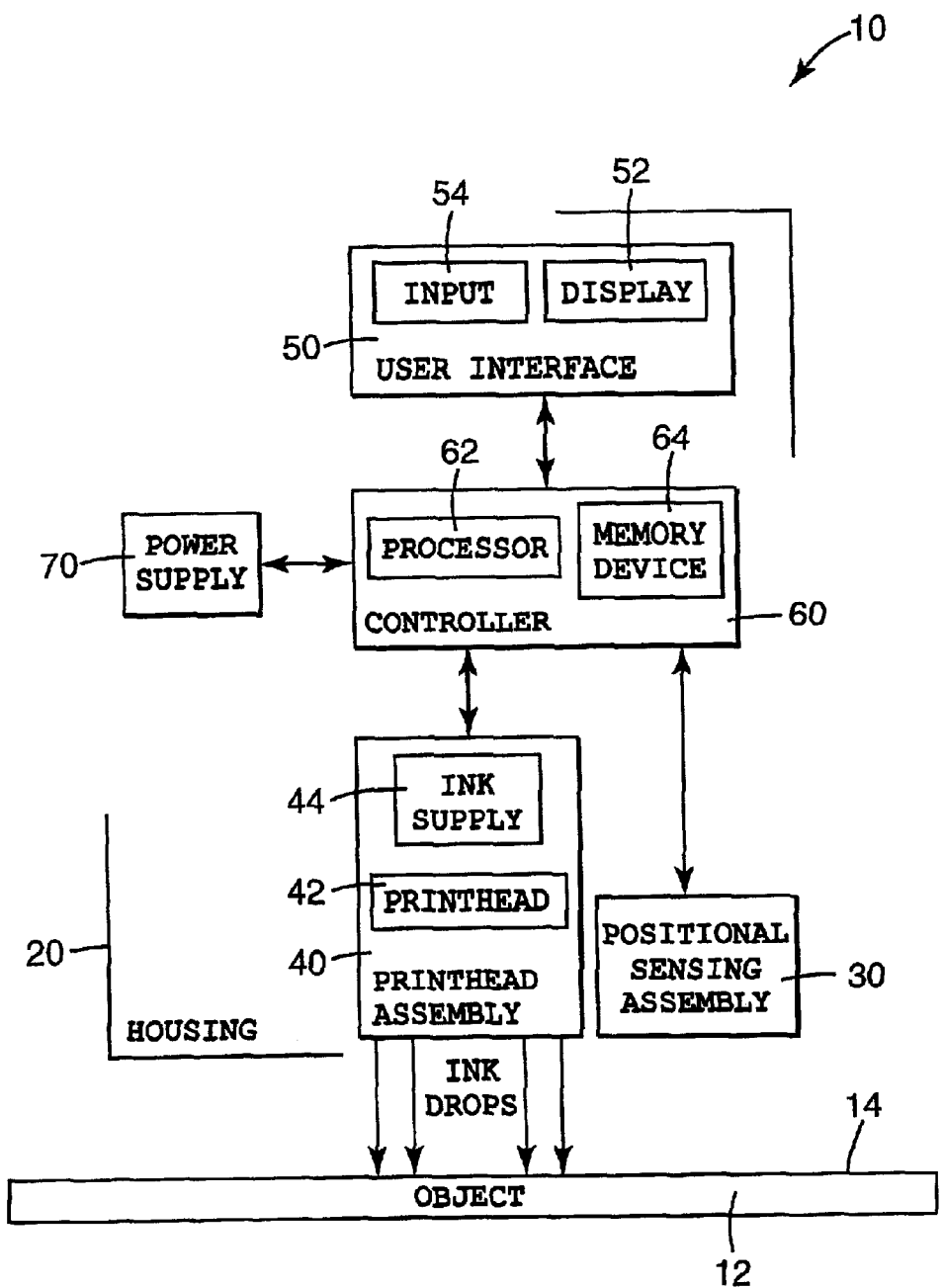
FIG. 1 is a block diagram illustrating one embodiment of a measurement and marking device according to the present invention.
Figure 2:
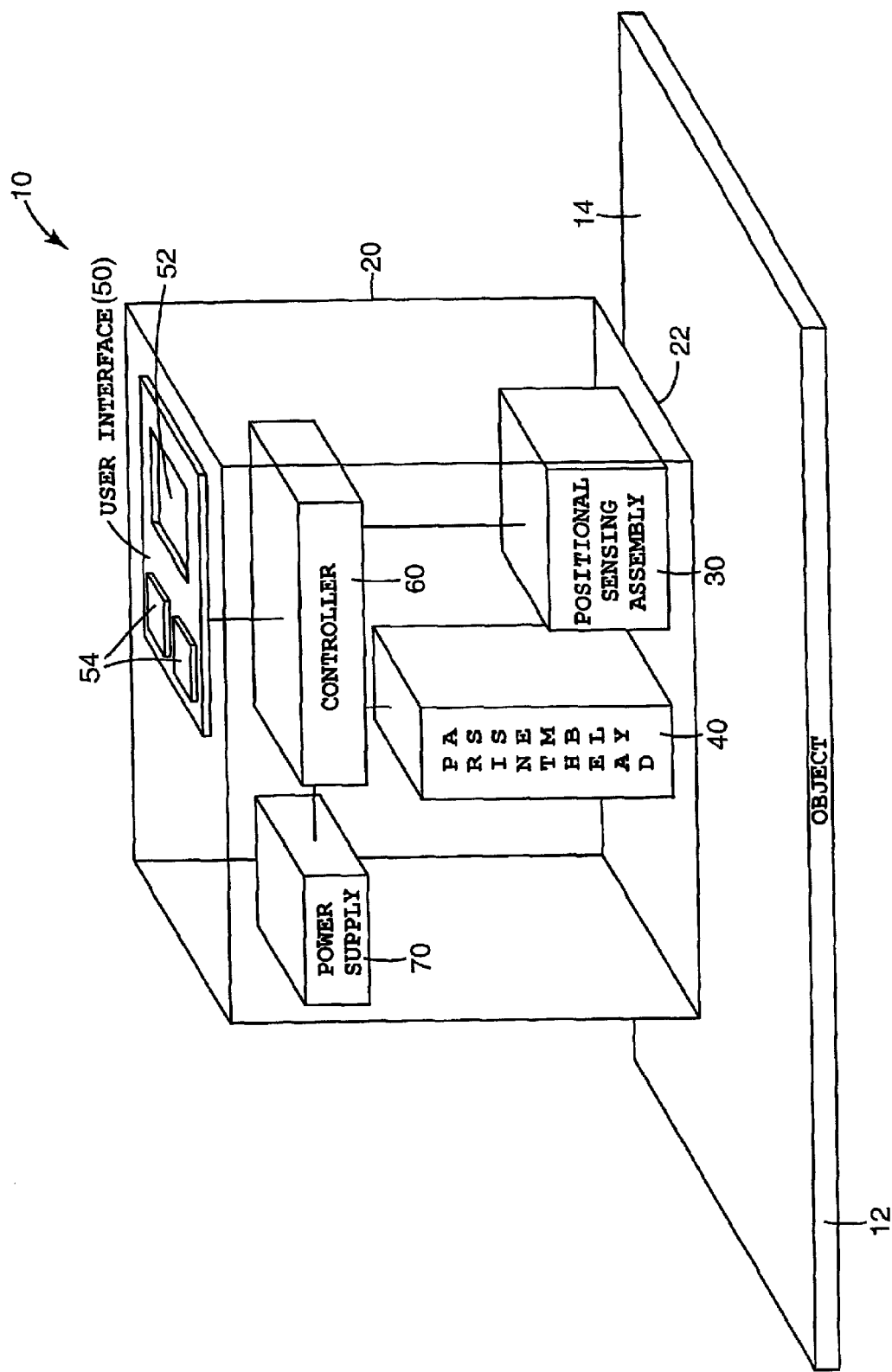
FIG. 2 is a schematic top perspective view of one embodiment of a measurement and marking device according to the present invention.

FIGS. 1 and 2 illustrate one embodiment of a measurement and marking device 10 according to the present invention. Measurement and marking device 10 is a handheld device configured for measuring an object 12, marking object 12 with a measurement, and/or transferring a measurement of object 12 to another object. Object 12 includes any material such as wood, plastic, steal, concrete, fabric, or other solid substance having at least one surface 14. As such, measurement and marking device 10 is positioned adjacent surface 14 of object 12 for measuring object 12, marking object 12, and/or transferring a measurement of object 12, as described below.

In one embodiment, measurement and marking device 10 includes a housing 20, a positional sensing assembly 30, a printhead assembly 40, a user interface 50, a controller 60, and a power supply 70. Positional sensing assembly 30, printhead assembly 40, user interface 50, controller 60, and power supply 70 are mounted in and/or on housing 20. Preferably, housing 20 is sized so as to be easily grasped and held in a hand of a user of measurement and marking device 10. Housing 20 has a side 22 oriented substantially parallel with surface 14 of object 12 when measurement and marking device 10 is positioned adjacent object 12. As such, side 22 of housing 20 follows surface 14 as measurement and marking device 10 is moved or advanced relative to object 12 by a user of measurement and marking device 10, as described below.

Positional sensing assembly 30 senses a position of measurement and marking device 10 and, more specifically, a position of housing 20 relative to object 12 as housing 20 is moved along surface 14 of object 12. As such, positional sensing assembly 30 measures a dimension of object 12 as housing 20 is moved relative to object 12. Positional sensing assembly 30 measures a dimension of object 12 by, for example, comparing a first position of housing 20 relative to object 12 with a second position of housing 20 relative to object 12. Example embodiments of a positional sensing assembly are described below with reference to FIGS. 3 and 4.

Printhead assembly 40 includes a printhead 42 and an ink supply 44 which supplies ink to printhead 42. As such, printhead 42 ejects drops of ink through a plurality of orifices or nozzles 46 (FIG. 3) and toward object 12 so as to print on object 12. Nozzles 46 are arranged in one or more columns or arrays such that properly sequenced ejection of ink from nozzles 46 causes characters, symbols, and/or other graphics or images to be printed upon object 12 as housing 20 and, therefore, printhead assembly 40 is moved relative to object 12. Nozzles 46 are formed in a front face 48 (FIG. 3) of printhead assembly 40 and front face 48 communicates with side 22 of housing 20 such that printhead assembly 40 prints on object 12 and, more specifically, surface 14 of object 12 as housing 20 is moved along surface 14 of object 12.

In one embodiment, user interface 50 includes a display 52 and one or more inputs 54. Display 52 includes a screen or other output surface which projects images to a user of measurement and marking device 10. Inputs 54 include, for example, buttons, keys, or switches which a user of measurement and marking device 10 may press for entry of information to measurement and marking device 10 or to operate and/or control functions of measurement and marking device 10. In addition, inputs 54 may permit a user of measurement and marking device 10 to interact with display 52 for input and/or selection of commands and/or functions of measurement and marking device 10. Display 52 and inputs 54 of user interface 50 are provided on a side of housing 20 for accessibility to a user of measurement and marking device 10.

Controller 60 includes a processor 62 and a memory device 64. Processor 62 includes logic circuitry which responds to and processes instructions for operating measurement and marking device 10. Memory device 64 receives and stores information for operation of measurement and marking device 10.

Controller 60 communicates with positional sensing assembly 30, printhead assembly 40, and user interface 50 to control operation of measurement and marking device 10. In one embodiment, controller 60 receives, for example, positional information from positional sensing assembly 30 and input information from user interface 50. As such, controller 60 processes the positional information and the input information and operates printhead assembly 40 to print on object 12, as described below. In addition, controller 60 conveys display information to display 52 of user interface 50.

Power supply 70 is mounted within housing 20 and supplies power for measurement and marking device 10. As such, power supply 70 communicates with controller 60 and user interface 50, printhead assembly 40, and/or positional sensing assembly 30. In one embodiment, power supply 70 communicates with user interface 50, printhead supply 40, and/or positional sensing assembly 30 via controller 60. While power supply 70 is illustrated as communicating with user interface 50, printhead assembly 40, and/or positional sensing assembly 30 via controller 60, it is within the scope of the present invention for power supply 70 to communicate directly with and supply power directly to user interface 50, printhead assembly 40, and/or positional sensing assembly 30.

Power supply 70 includes, for example, a battery, including a rechargeable storage battery, which supplies electric current for measurement and marking device 10. In addition, power supply 70 may include an AC power adapter for accommodating the supply of alternating current to measurement and marking device 10.

Figure 3:
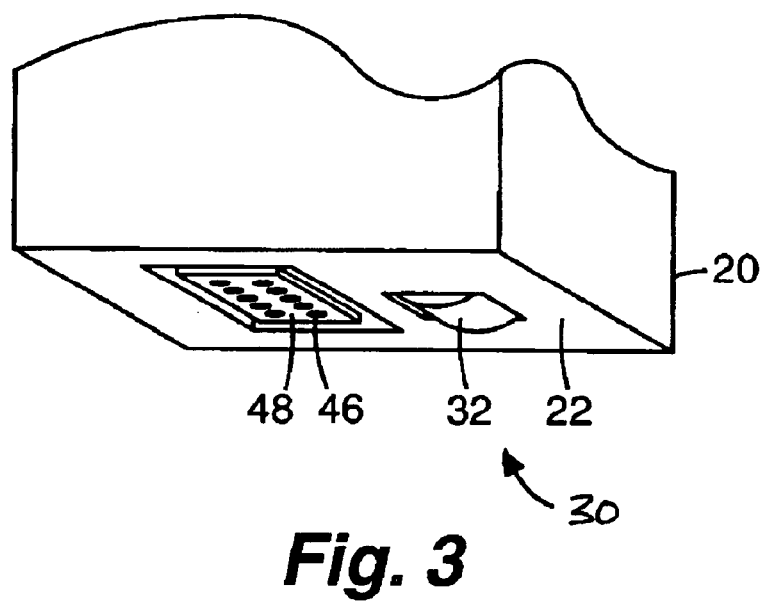
FIG. 3 is a bottom perspective view of the measurement and marking device of FIG. 2 illustrating one embodiment of a positional sensing assembly according to the present invention.

FIG. 3 illustrates one embodiment of positional sensing assembly 30. Positional sensing assembly 30 includes a wheel 32 which contacts surface 14 of object 12 as housing 20 is moved along surface 14 of object 12. As such, wheel 32 may include a frictional coating on a circumferential surface thereof to ensure rolling contact with surface 14 as housing 20 is moved along surface 14.

Wheel 32 is rotatably mounted in housing 20 and communicates with side 22 of housing 20 such that a portion of wheel 32 protrudes from side 22. As such, wheel 32 contacts object 12 and rotates relative to housing 20 as housing 20 is moved along surface 14 of object 12. In one embodiment, positional sensing assembly 30 includes, for example, a rotational encoder which senses rotation of wheel 32 and communicates the rotation with controller 60. Thus, rotation of wheel 32 correlates to an amount of movement of housing 20 relative to object 12 and, therefore, a position of housing 20 relative to object 12. As such, rotation of wheel 32 measures a dimension of object 12.

Figure 4:
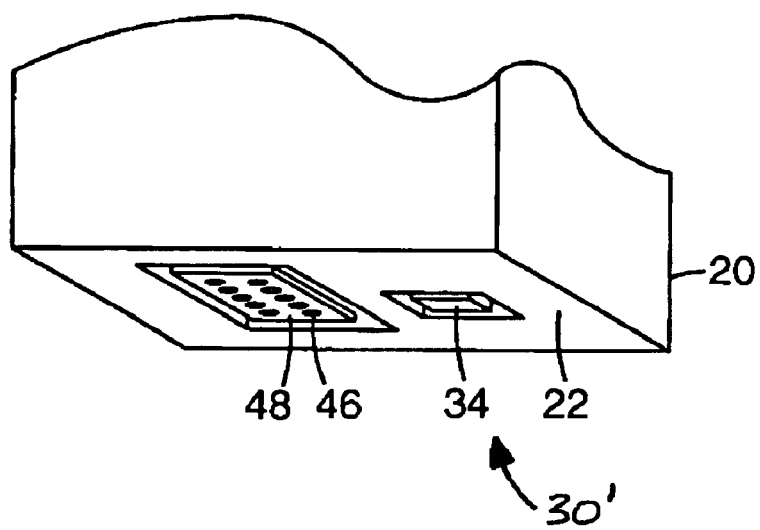
FIG. 4 is a bottom perspective view similar to FIG. 3 illustrating another embodiment of a positional sensing assembly according to the present invention.

FIG. 4 illustrates another embodiment of positional sensing assembly 30. Positional sensing assembly 30' includes an optical sensor 34 which senses surface 14 of object 12 as housing 20 is moved along surface 14 of object 12. Optical sensor 34 is mounted in housing 20 and communicated to side 22 of housing 20. As such, optical sensor 34 senses characteristics of surface 14 of object 12 as housing 20 is moved along surface 14 of object 12. Thus, changes in characteristics of surface 14 correlate to a change in position of housing 20 relative to object 12 and, therefore, an amount of movement of housing 20 relative to object 12. Accordingly, a position of housing 20 relative to object 12 and a dimension of object 12 can be established based on surface 14 of object 12.

While positional sensing assembly 30 is illustrated as including wheel 32 or optical sensor 34, it is within the scope of the present invention for positional sensing assembly 30 to include other positional and/or measurement sensing devices. For example, positional sensing assembly 30 may include a laser or an ultrasonic positional and/or measurement sensing device. In addition, positional sensing assembly 30 may include a combination of positional and measurement sensing devices. For example, positional sensing assembly 30 may include a laser for sensing a dimension of object 12 and wheel 32 for sensing a position of housing 20 relative to object 12 as housing 20 is moved along surface 14 of object 12.

Figure 5:
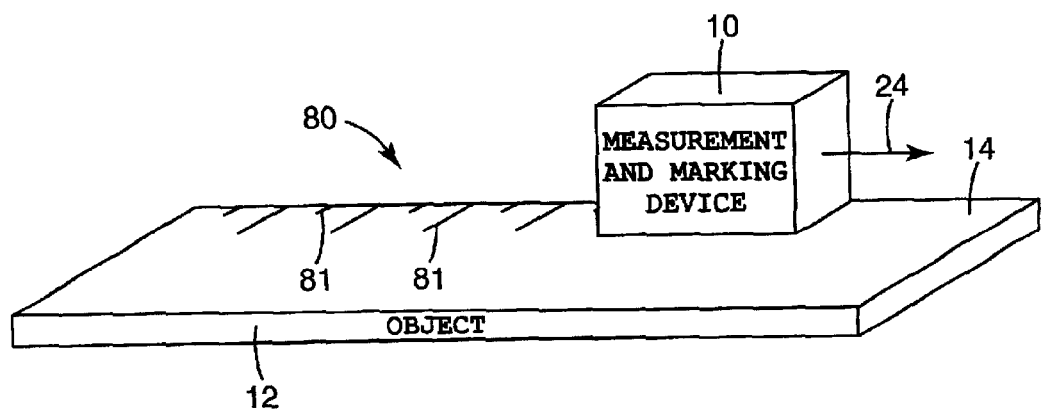
FIG. 5 is a schematic illustration of one embodiment of printing measurement markings on an object with a measurement and marking device according to the present invention.

In one embodiment, as illustrated in FIG. 5, measurement and marking device 10 is used to print a measurement marking 80 on object 12. As such, side 22 of housing 20 is positioned adjacent surface 14 of object 12 and housing 20 is moved relative to object 12 by a user of measurement and marking device 10, as indicated by arrow 24. As housing 20 is moved relative to object 12, the position of housing 20 relative to object 12 is sensed by positional sensing assembly 30 as described above. Thus, when the position of housing 20 corresponds to a predetermined position, measurement marking 80 is automatically printed on surface 14 of object 12. Measurement marking 80 may include, for example, graphics and/or text such as symbols or annotations.

In one embodiment, the predetermined position includes a standard measurement or length unit such as an inch or centimeter and/or a plurality of scaled measurements or length units such as ⅛ scale, ½ scale, etc. Measurement marking 80, therefore, includes a plurality of spaced ticks 81 which are printed on surface 14 of object 12 by printhead assembly 40. As such, ticks 81 are spaced at predetermined intervals as input, specified, and/or selected by a user of measurement and marking device 10.

In addition, the predetermined position may include one or more distinct positions which are input, specified, and/or selected by a user of measurement and marking device 10. Thus, measurement marking 80 includes, for example, one or more distinct ticks 81 printed on surface 14 of object 12 by printhead assembly 40. As such, ticks 81 are spaced based on the position or positions input, specified, and/or selected by the user of measurement and marking device 10.

In another embodiment, as illustrated in FIGS. 6A–6E, measurement and marking device 10 is used to transfer a feature of a first object 12a and, more specifically, a measurement of first object 12a to a second object 12b. First object 12a and second object 12b, similar to object 12, each include at least one surface 14a and 14b, respectively. The feature of first object 12a includes, for example, a dimension of first object 12a, a position on first object 12a, and/or an association with first object 12a.

Figure 6A:
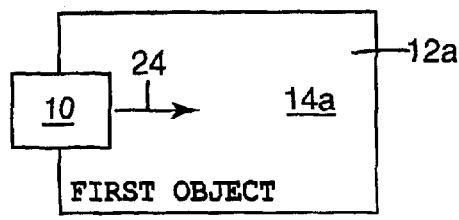
FIGS. 6A, 6B, 6C, 6D, and 6E are schematic illustrations of one embodiment of transferring a measurement of a first object to a second object with a measurement and marking device according to the present invention.

As illustrated in FIG. 6A, measurement and marking device 10 is positioned adjacent surface 14a of first object 12a and moved or advanced relative to first object 12a, as indicated by arrow 24. As such, a position of housing 20 relative to object 12 is sensed by positional sensing assembly 30 and input to controller 60.

Figure 6B:
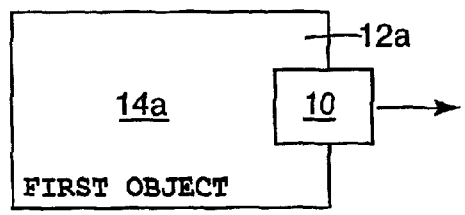

As illustrated in FIG. 6B, a feature of first object 12a is located. For example, to transfer a dimension of first object 12a, housing 20 is moved across first object 12a to an edge of first object 12a. The edge of first object 12a, therefore, constitutes the feature of first object 12a. Thus, when measurement and marking device 10 is at the edge of first object 12a, the user of measurement and marking device 10 interacts with user interface 50 to input and, more specifically, locate the feature of first object 12a.

To locate the feature of first object 12a, a user of measurement and marking device 10 operates, for example, input 54 to record the position of the feature of first object 12a. As such, the position of housing 20 at the feature of first object 12a is automatically stored or recorded in measurement and marking device 10. Thus, the position of housing 20 at the feature of first object 12a forms a predetermined position stored in controller 60. In addition, the position of housing 20 relative to first object 12a is recorded in controller 60 with any additional input to measurement and marking device 10 via, for example, user interface 50.

Figure 6C:
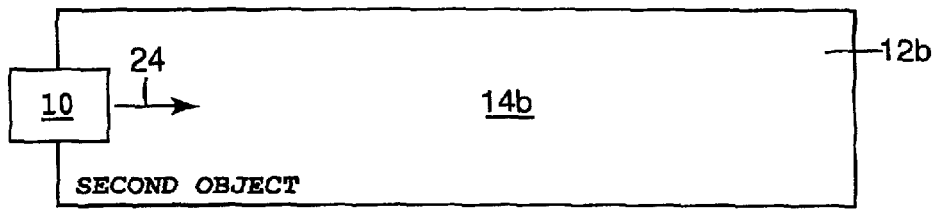

As illustrated in FIG. 6C, measurement and marking device 10 is positioned adjacent surface 14b of second object 12b and moved relative to second object 12b, as indicated by arrow 24. As such, a position of housing 20 relative to second object 12b is sensed by positional sensing assembly 30 and input to controller 60, as described above.

Figure 6D:
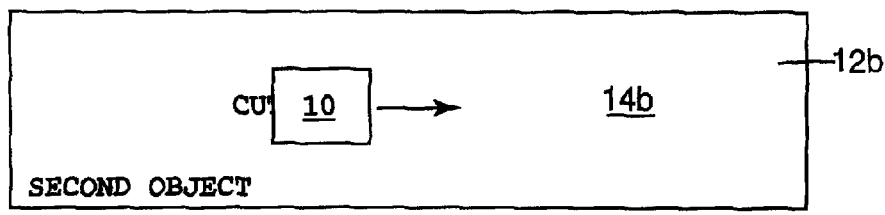

As illustrated in FIG. 6D, when the position of measurement and marking device 10 and, more specifically, the position of housing 20 relative to second object 12b coincides with the position of housing 20 at the feature of first object 12a, a mark 82 is printed on surface 14b of second object 12b. As such, mark 82 represents a transfer of the feature of first object 12a to second object 12b. More specifically, mark 82 represents a transfer of a dimension of and/or a dimension to the feature of first object 12a to second object 12b. While only one mark 82 is illustrated as being printed on second object 12b, it is within the scope of the present invention for one or more marks 82 to be printed on second object 12b.

Mark 82 includes, for example, graphics and/or text, such as symbols or annotations, or any combination of graphics and text. An example of mark 82 includes "CUT→|WASTE". As such, the example of mark 82 includes a symbol which indicates a cut line of second object 12b as transferred from and coinciding with the feature of first object 12a. In addition, the example of mark 82 includes an annotation which identifies which side of the cut line is considered "waste" or excess.

Figure 6E:
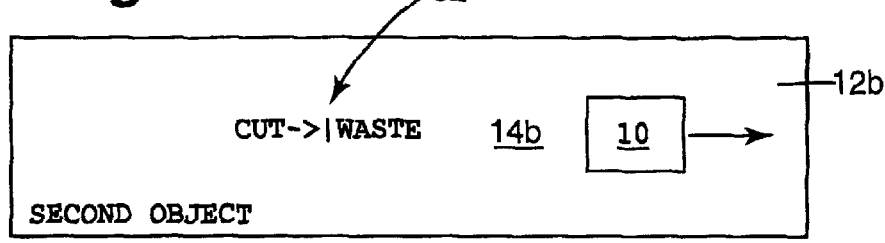

As illustrated in FIG. 6E, measurement and marking device 10 may be moved or advanced beyond the position of second object 12b coinciding with the position of the feature of first object 12a to print additional graphics and/or text on surface 14b of second object 12b.

While measurement and marking device 10 is illustrated and described as locating and transferring one feature of first object 12*a*, it is understood that measurement and marking device 10 may locate and transfer any number of features of first object 12*a*. As such, the positions of such features are stored in memory device 64. In addition, user input, such as notes or references, may be input via user interface 50 and stored with the respective features.

While second object 12*b* is illustrated as being larger than first object 12*a* and FIGS. 6A–6E illustrate the transfer of a measurement from first object 12*a* to second object 12*b*, it is understood that a feature of second object 12*b* may be located and transferred from second object 12*b* to first object 12*a*. In addition, a feature of first object 12*a* may transferred to another portion of first object 12*a*. In addition, first object 12*a* may represent an object to be placed and second object 12*b* may represent and, therefore, be marked as an object to receive first object 12*a*. Furthermore, while measurement and marking device 10 is illustrated as locating and transferring a feature of first object 12*a* in one dimension, it is within the scope of the present invention for measurement and marking device 10 to locate and transfer features of first object 12*a* in one or more dimensions.

Figure 7:
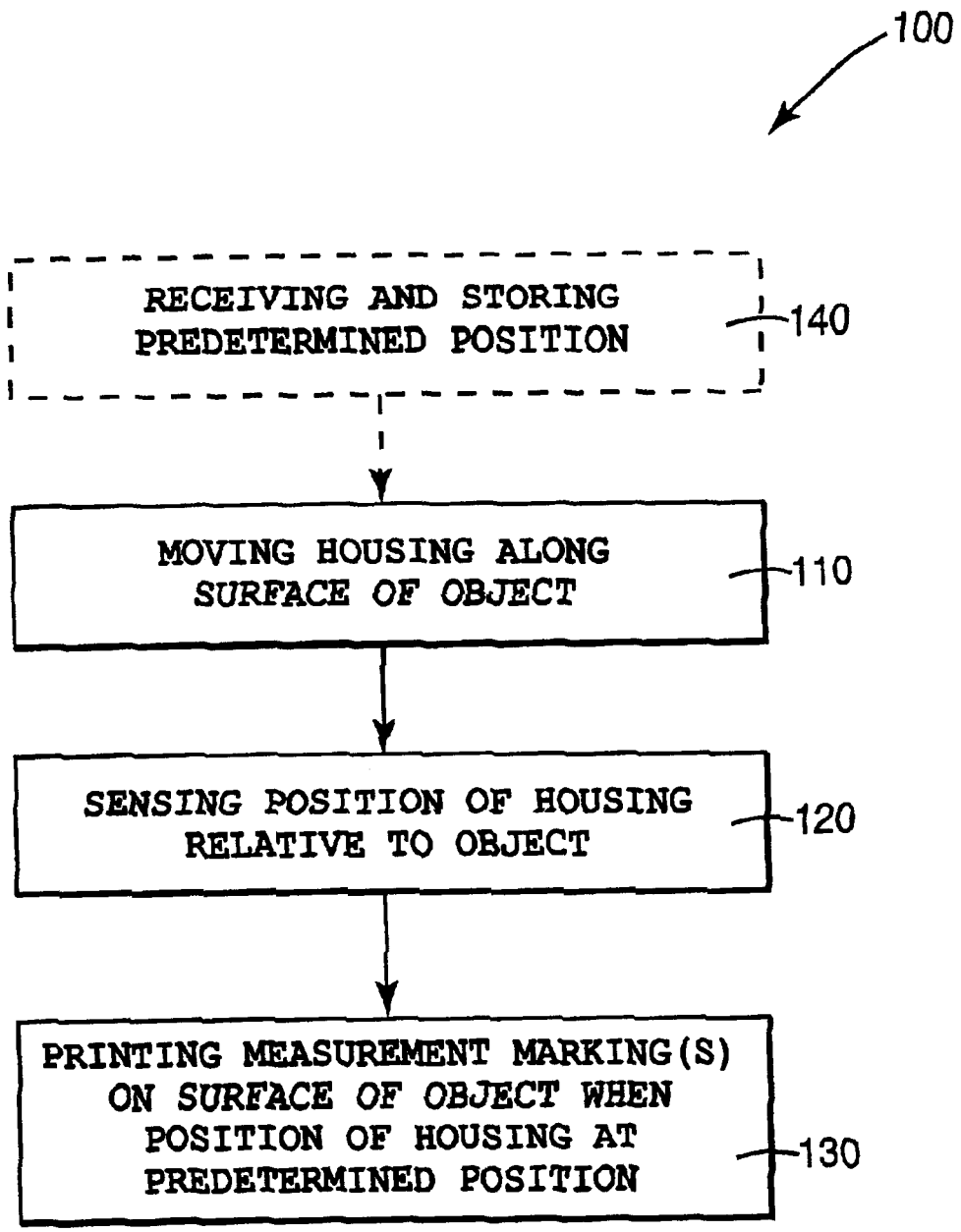
FIG. 7 is a flow diagram illustrating one embodiment of a method of printing a measurement marking on an object according to the present invention.

FIG. 7 illustrates one embodiment of a method 100 of printing measurement marking 80 on object 12 according to the present invention. Reference is also made to FIGS. 1–6. At step 110, housing 20 is moved along surface 14 of object 12. More specifically, side 22 of housing 20 is positioned adjacent surface 14 of object 12 and housing 20 is moved relative to object 12, as illustrated, for example, in FIG. 5. Preferably, side 22 of housing 20 is oriented substantially parallel with surface 14 of object 12 as housing 20 is moved relative to object 12.

At step 120, a position of housing 20 relative to object 12 is sensed. The position of housing 20 relative to object 12 is sensed by positional sensing assembly 30 and input to controller 60, as described above. Thus, controller 60 monitors the position of housing 20 relative to object 12.

At step 130, measurement marking 80 is printed on surface 14 of object 12 when the position of housing 20 relative to object 12 corresponds to a predetermined position. Measurement marking 80 is printed on surface 14 by printhead assembly 40 as controlled by controller 60. As such, controller 60 operates printhead assembly 40 to print measurement marking 80 on surface 14 of object 12 when the predetermined position is sensed by positional sensing assembly 30. Thus, measurement marking 80 corresponds with the predetermined position as recorded and/or stored in controller 60. The predetermined position and, therefore, measurement marking 80 includes, for example, a plurality of standard measurements or length units such as inches or centimeters or a plurality of scaled measurements or length units such as ⅛ scale, ½ scale, etc., as described above.

In one embodiment, at step 140, the predetermined position at which measurement marking 80 is printed is received and stored in controller 60. Preferably, prior to moving housing 20 along object 12 to sense the position of housing 20 and print measurement marking 80, the predetermined position for measurement marking 80 is received by controller 60 and stored in memory device 64. The predetermined position can include, for example, a position which is input, specified, or selected by a user of measurement and marking device 10 via, for example, user interface 50.

In addition, the predetermined position can include a position which is downloaded to measurement and marking device 10. For example, measurement and marking device 10 may communicate with a computer, computer server, or other computing device to receive a plurality of predetermined positions for a plurality of measurement markings 80. Thus, the plurality of measurement markings 80 may identify different measurements for the creation or fabrication of an item. The plurality of measurement markings may include, for example, measurements for a woodworking or metal fabrication project.

Figure 8:
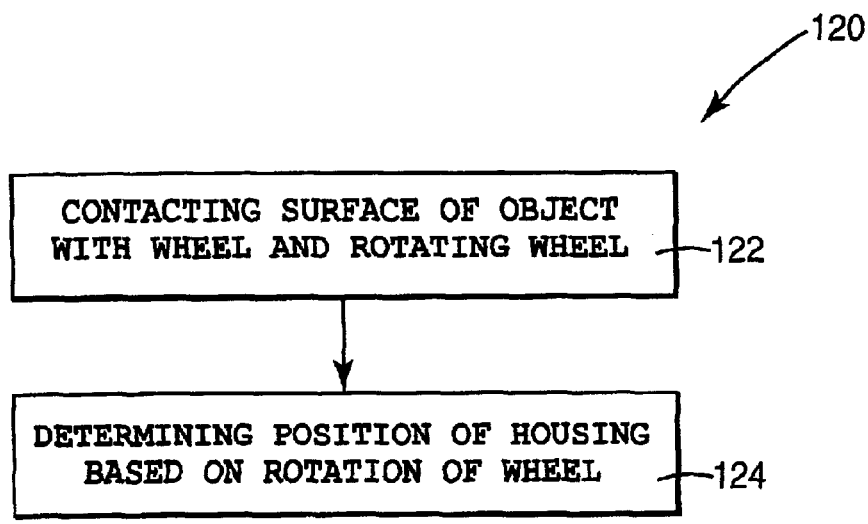
FIG. 8 illustrates one embodiment of sensing a position of a housing relative to the object in the method of FIG. 7.

FIG. 8 illustrates one embodiment of sensing the position of housing 20 relative to object 12 in step 120. As such, step 120 includes contacting surface 14 of object 12 with wheel 32 and rotating wheel 32 relative to housing 20, as indicated in step 122. More specifically, wheel 32 is rotated relative to housing 20 as housing 20 is moved along surface 14 of object 12. As such, the position of housing 20 relative to object 12 is determined based on the rotation of wheel 32, as indicated in step 124. More specifically, the rotation of wheel 32 is correlated to an amount or distance of movement of housing 20 relative to object 12 and, therefore, a position of housing 20 relative to object 12 and a measurement of object 12, as described above.

Figure 9:
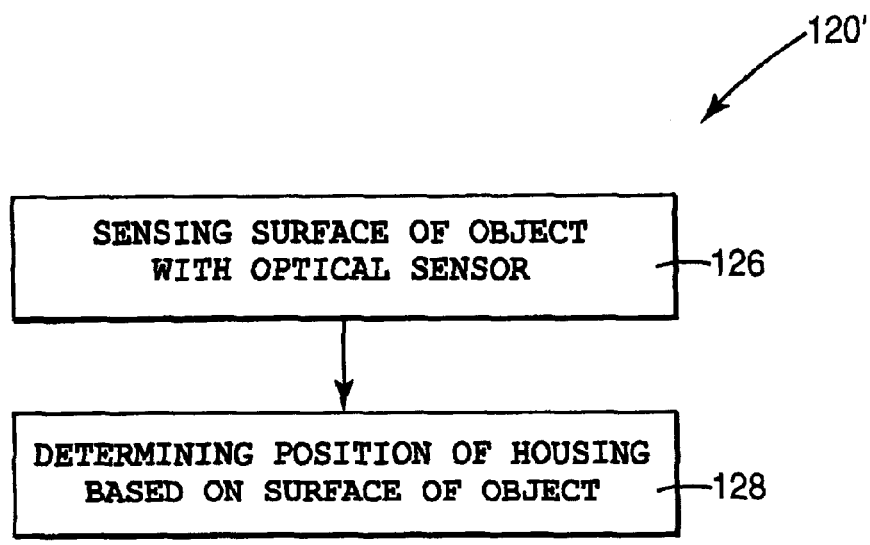
FIG. 9 illustrates another embodiment of sensing a position of a housing relative to the object in the method of FIG. 7.

FIG. 9 illustrates another embodiment of sensing the position of housing 20 relative to object 12 in step 120. As such, step 120' includes sensing surface 14 of object 12 with optical sensor 34, as indicated in step 126. More specifically, optical sensor 34 senses characteristics of surface 14 as housing 20 is moved along surface 14 of object 12. As such, the position of housing 20 relative to object 12 is determined based on surface 14 of object 12, as indicated in step 128. More specifically, changes in characteristics of surface 14 correlate to a change in position of housing 20 relative to object 12 and, therefore, an amount or distance of movement of housing 20 relative to object 12 and a measurement of object 12, as described above.

Figure 10:
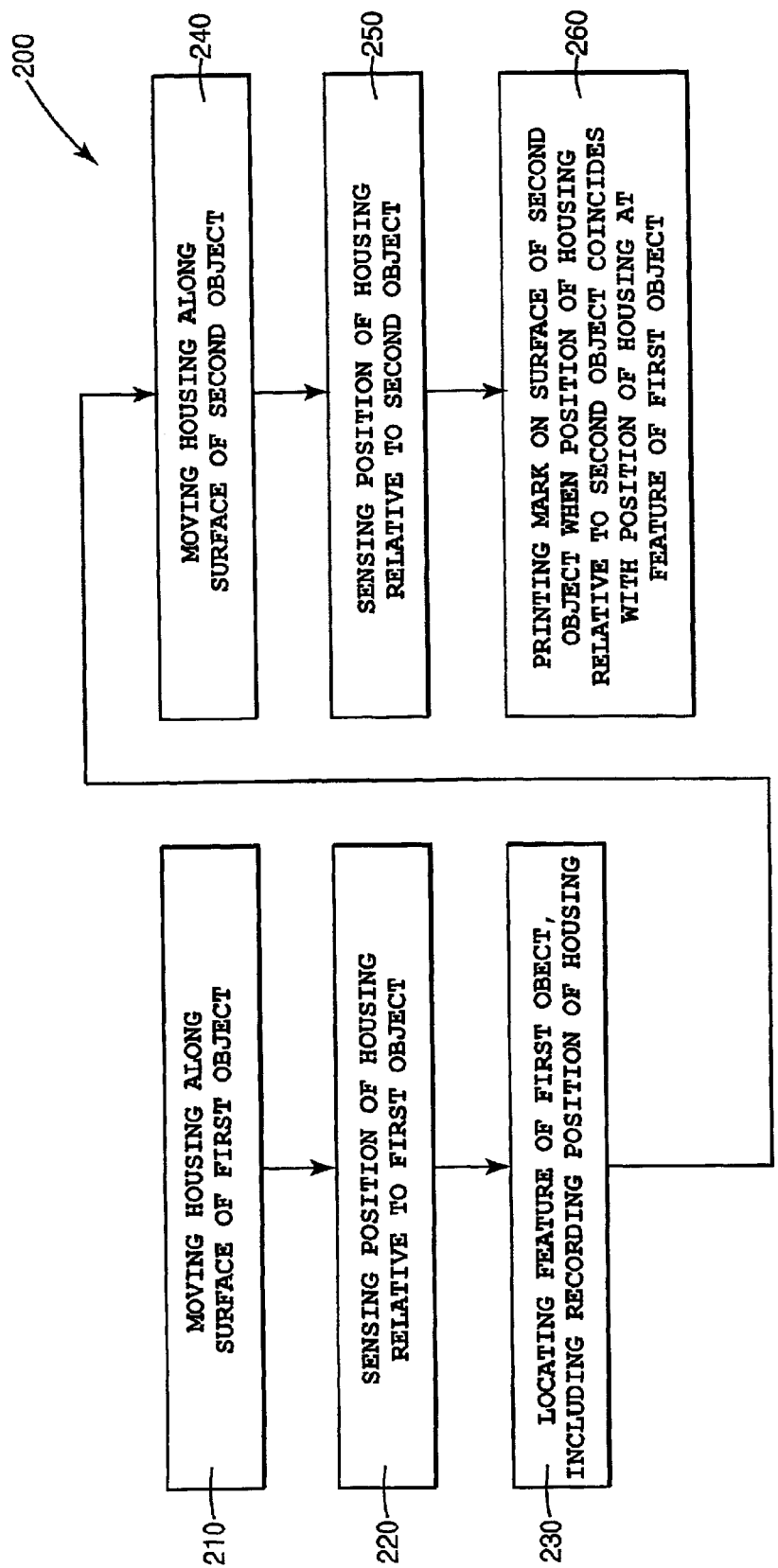
FIG. 10 is a flow diagram illustrating one embodiment of a method of transferring a measurement of a first object to a second object according to the present invention.

FIG. 10 illustrates one embodiment of a method 200 of transferring a measurement of first object 12*a* to second object 12*b* according to the present invention. Reference is also made to FIGS. 1–9. At step 210, housing 20 is moved along surface 14*a* of first object 12*a*. More specifically, housing 20 is positioned adjacent surface 14*a* of first object 12*a* and moved relative to first object 12*a*, as illustrated, for example, in FIGS. 6A and 6B.

At step 220, a position of housing 20 relative to first object 12*a* is sensed. The position of housing 20 relative to first object 12*a* is sensed by positional sensing assembly 30, as described above.

At step 230, a feature of first object 12*a* is located and a position of housing 20 at the feature is recorded. The feature of first object 12*a* is located by input to user interface 50 by a user of measurement and marking device 10, as described above. As such, the position of housing 20 relative to first object 12*a* is recorded in controller 60 with the input to user interface 50.

At step 240, housing 20 is moved along surface 14*b* of second object 12*b*. More specifically, housing 20 is positioned adjacent surface 14*b* of second object 12*b* and moved relative to second object 12*b*, as illustrated, for example, in FIGS. 6C and 6D.

At step 250, a position of housing 20 relative to second object 12*b* is sensed. The position of housing 20 relative to second object 12*b* is sensed by positional sensing assembly 30, as described above.

At step 260, mark 82 representing the feature or, more specifically, the measurement for the feature of first object 12*a* is printed on surface 14*b* of second object 12*b*. Mark 82 is printed on surface 14*b* of second object 12*b* when the position of housing 20 relative to second object 12*b* coincides with the position of housing 20 at the feature of first object 12*a*, as recorded in controller 60.

Mark 82 is printed on surface 14b of second object 12b in step 260 by printhead assembly 40 as controlled by controller 60. As such, controller 60 operates printhead assembly 40 to print mark 82 on surface 14b of second object 12b when the position coinciding with the recorded position of housing 20 at the feature of first object 12a is sensed by positional sensing assembly 30. Mark 82 includes, for example, graphics and/or text, as described above.

Figure 11:
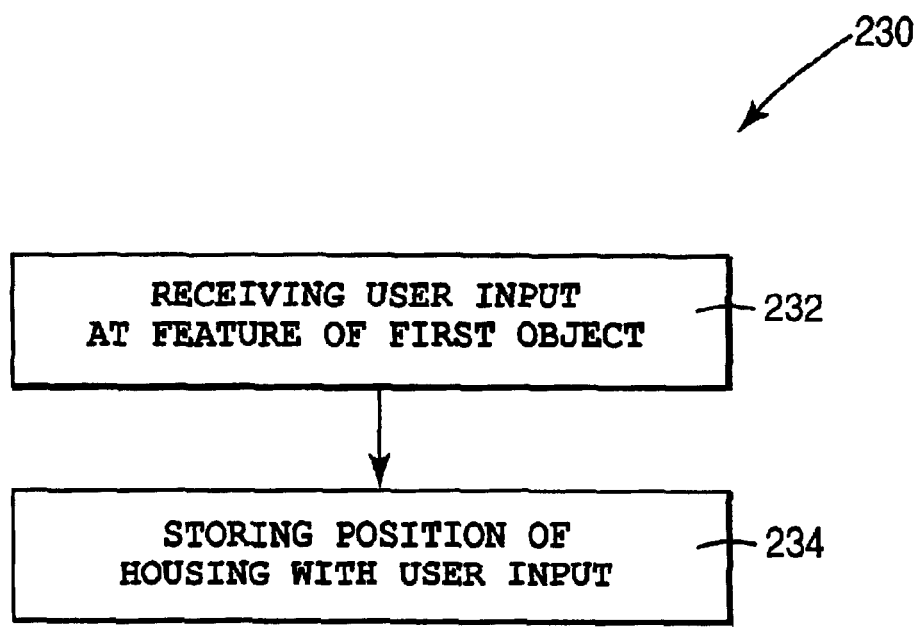
FIG. 11 illustrates one embodiment of locating a feature of the first object and recording a position of a housing at the feature of the first object in the method of FIG. 10.

FIG. 11 illustrates one embodiment of locating the feature of first object 12a and recording the position of housing 20 at the feature of first object 121 in step 230. As such, step 230 includes receiving input from a user of measurement and marking device 10 at the feature of first object 12a, as indicated in step 232. More specifically, the user of measurement and marking device 10 interacts with user interface 50 to indicate or input the feature of first object 12a when the position of housing 20 coincides with the feature of first object 12a. As such, the position of housing 20 is stored with the user input, as indicated in step 234. Thus, the user input and the associated position of housing 20 when the user input is received are stored in controller 60 and, more specifically, memory device 64.

By incorporating both measurement and marking capabilities within measurement and marking device 10, measurement and marking device 10 facilitates measurement of an object as well as marking of an object with measurement marking 80. More specifically, measurement and marking device 10 measures dimensions of an object, records and stores the dimensions, and subsequently prints the dimensions with annotations or other markings. As such, measurement and marking device 10 facilitates the transfer of a measurement from a first object to a second object. Thus, a user of measurement and marking device 10 need only handle or operate a single device for the transfer of a measurement from the first object to the second object. In addition, the need for a recording medium, such as paper, for recording of the measurement during the transfer is eliminated.

By providing measurement and marking device 10 with controller 60 and, more specifically, processor 62, measurement and marking device 10 can process and calculate predetermined positions for measurement markings 80 and/or mark 82. Such positions may be based on user input to controller 60 via user interface 50 or standard layouts stored in or downloaded to measurement and marking device 10. In addition, measurement and marking device 10 can automatically scale dimensions or measurements as well as compensate for common configurations such as equal or preset spacing.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A device, comprising:

a positional sensor mounted in a housing and adapted to sense the housing position as the housing is moved along a surface;

a printhead mounted in the housing and adapted to print on the surface as the housing is moved along the surface;

a controller mounted in the housing and communicating with the positional sensor and the printhead, the controller adapted to operate the printhead to print on the surface based on housing position as the housing is moved along the surface; and an interface mounted on the housing and communicating with the controller, the interface including an input configured for operation by a user to record at least one housing position, the housing having a side adapted to be oriented substantially parallel with the surface as the housing is moved along the surface, the positional sensor communicating with the side of the housing through a first opening and the printhead communicating with the side of the housing through a second opening, the controller adapted to store the at least one housing position as a measurement when the input of the interface is operated by the user.

2. The device of claim 1, wherein the positional sensor is adapted to sense housing position relative to a first object and measure a dimension of the first object as the housing is moved along a surface of the first object, wherein the positional sensor is adapted to sense housing position relative to a second object as the housing is moved along a surface of the second object, and wherein the controller is adapted to operate the printhead to print on the surface of the second object based on the dimension of the first object and the housing position relative to the second object as the housing is moved along the surface of the second object.

3. The device of claim 2, wherein the controller is adapted to operate the printhead to print on the surface of the second object based on the housing position relative to the first object when the input is operated by the user and the housing position relative to the second object as the housing is moved along the surface of the second object.

4. The device of claim 1, wherein the controller is adapted to operate the printhead to print a plurality of markings on the surface at predetermined intervals as the housing is moved along the surface.

5. The device of claim 4, wherein the plurality of markings represent one of standard measurements and scaled measurements.

6. The device of claim 1, wherein the printhead is adapted to print at least one of graphics and text on the surface as the housing is moved along the surface.

7. The device of claim 1, wherein the positional sensor includes a wheel rotatably mounted in the housing, wherein the wheel is adapted to contact the surface and rotate as the housing is moved along the surface, and wherein the controller is adapted to determine the housing position based on rotation of the wheel.

8. The device of claim 1, wherein the positional sensor includes an optical sensor mounted in the housing, wherein the optical sensor is adapted to sense the surface as the housing is moved along the surface, and wherein the controller is adapted to determine the housing position based on the surface.

9. The marking device of claim 1, wherein the printhead includes a plurality of orifices formed in a front face thereof, wherein the front face communicates with the side of the housing.

10. The device of claim 1, further comprising:
a power supply mounted in the housing, wherein the power supply supplies power to the device.

11. The device of claim 1, wherein the positional sensor is adapted to measure a dimension of a first object as the housing is moved along a surface of the first object, and wherein the controller is adapted to operate the printhead to print on a surface of a second object at the dimension of the first object as the housing is moved along the surface of the second object.

12. The device of claim 1, wherein the positional sensor is adapted to measure a dimension of a first object as the housing is moved along a surface of the first object, and wherein the controller is adapted to operate the printhead to print on a surface of a second object at predetermined intervals within the dimension of the first object as the housing is moved along the surface of the second object.

13. The device of claim 1, wherein the controller is adapted to operate the printhead to print on the surface based on the housing position and the measurement as stored by the controller.

14. A method, comprising:
moving a housing along a first object surface, including orienting a side of the housing substantially parallel with the first object surface;
sensing the housing position relative to the first object with a positional sensor mounted in the housing and communicating with the side of the housing through a first opening as the housing is moved along the first object surface;
locating a first object feature, including receiving user input at the first object feature with an input of an interface mounted on the housing and storing the housing position at the first object feature as a measurement of the first object with a controller mounted in the housing and communicating with the interface;
moving the housing along a second object surface, including orienting the side of the housing substantially parallel with the second object surface;
sensing housing position relative to the second object with the positional sensor as the housing is moved along the second object surface; and
printing on the second object surface with a printhead mounted in the housing and communicating with the side of the housing through a second opening when the housing position relative to the second object coincides with the housing position at the first object feature.

15. The method of claim 14, wherein sensing the housing position relative to the first object includes measuring a dimension of the first object, wherein locating the first object feature includes measuring at least one of a dimension to the first object feature and a dimension of the first object feature, and wherein printing on the second object includes printing on the second object surface when the housing position relative to the second object coincides with the at least one of the dimension to the first object feature and the dimension of the first object feature.

16. The method of claim 14, wherein printing on the second object surface includes printing at least one of graphics and text on the second object surface.

17. The method of claim 14, wherein moving the housing along the first object surface and the second object surface includes contacting the first object surface and the second object surface with a wheel rotatably mounted in the housing and rotating the wheel, and wherein sensing the housing position relative to the first object and the second object includes determining the housing position relative to the first object and the second object based on rotation of the wheel.

18. The method of claim 14, wherein moving the housing along the first object surface and the second object surface includes sensing the first object surface and the second object surface with an optical sensor mounted in the housing, and wherein sensing the housing position relative to the first object and the second object includes determining the housing position relative to the first object and the second object based on the first object surface and the second object surface, respectively.

19. The method of claim 14, wherein sensing the housing position relative to the first object includes measuring a dimension of the first object, and wherein printing on the second object surface includes printing on the second object surface at the dimension of the first object.

20. The method of claim 14, wherein sensing the housing position relative to the first object includes measuring a dimension of the first object, and wherein printing on the second object surface includes printing on the second object surface at predetermined intervals within the dimension of the first object.

21. The method of claim 14, wherein printing on the second object surface includes printing on the second object surface based on the housing position relative to the second object and the measurement of the first object as stored by the controller.

\* \* \* \* \*